United States Patent [19]
Nagy et al.

[11] Patent Number: 5,648,785
[45] Date of Patent: Jul. 15, 1997

[54] VEHICLE WINDOW WITH ANTENNA CONNECTION APPARATUS

[75] Inventors: Louis Leonard Nagy; Douglas Courtney Martin, both of Warren; Michael Jerome Lewis, Southfield, all of Mich.

[73] Assignees: General Motors Corporation, Detroit, Mich.; Delco Electronics Corp., Kokomo, Ind.

[21] Appl. No.: 610,656

[22] Filed: Mar. 4, 1996

Related U.S. Application Data

[63] Continuation-in-part of Ser. No. 445,884, May 22, 1995, Pat. No. 5,528,314.

[51] Int. Cl.$^6$ ..................................................... H01Q 1/32
[52] U.S. Cl. ........................................ 343/713; 343/906
[58] Field of Search .................................. 343/713, 704, 343/906; H01Q 1/32

[56] References Cited

U.S. PATENT DOCUMENTS

| | | | |
|---|---|---|---|
| 3,579,243 | 5/1971 | Dickason et al. | 343/713 |
| 3,866,232 | 2/1975 | Weigt | 343/713 |
| 4,768,037 | 8/1988 | Inaba et al. | 343/713 |
| 5,005,020 | 4/1991 | Ogawa et al. | 343/713 |
| 5,012,255 | 4/1991 | Becker | 343/704 |
| 5,017,933 | 5/1991 | Sakurai et al. | 343/704 |
| 5,083,135 | 1/1992 | Nagy et al. | 343/713 |

*Primary Examiner*—Michael C. Wimer
*Attorney, Agent, or Firm*—Robert M. Sigler

[57] ABSTRACT

A vehicle has a window opening with a window comprising inner and outer glass layers and an interposed layer. The peripheral edge of the inner glass layer is indented in a notch which exposes an area of the outer glass layer, the space vacated by the notch being filled by an insulating member. A sealing strip, which may be electrically conducting, is disposed within the vehicle across the surface of the inner glass layer and the insulating member. An antenna is disposed between the inner and outer glass layers and has a connecting portion extending onto the exposed area of the outer glass layer. A connecting member has a connecting patch affixed to the connecting portion of the antenna within the exposed area and a feed portion extending therefrom between the insulating member and the notch of the peripheral edge of the inner glass layer to the interior of the vehicle without contacting the sealing strip. If the insulating member has a high dielectric constant, the end of the connecting member of the antenna within the exposed area is spaced away from the peripheral edge of the outer glass layer so as to minimize overlap with the sealing strip and thus capacitive coupling therebetween.

5 Claims, 4 Drawing Sheets

5,648,785

VEHICLE WINDOW WITH ANTENNA CONNECTION APPARATUS

BACKGROUND OF THE INVENTION

This is a Continuation-in-Part of U.S. Ser. No. 08/445884, filed May 22, 1995 by Louis L. Nagy et al, now U.S. Pat. No. 5,528,314. The technical field of the invention is connection apparatus for a vehicle window antenna. More particularly, the invention relates to connection apparatus for an antenna comprising an electrically conductive material between two glass layers of a vehicle window having a sealing strip adjacent the peripheral edge thereof. Such a sealing strip may be made of a urethane or similar material which may have ingredients making it electrically conductive. Contact or capacitive coupling between the sealing strip and antenna or connection apparatus can thus reduce antenna performance.

SUMMARY OF THE INVENTION

The object of the invention is thus to provide connection apparatus for a vehicle window antenna which does not contact or capacitively couple the antenna to a sealing strip near a peripheral edge of the window. The window is in a window opening of a vehicle and comprises outer and inner glass layers, the outer glass layer having a first surface on the outside of the vehicle, a second surface, and a peripheral edge and the inner glass layer having a first surface adjacent the interior of the vehicle, a second surface, and a peripheral edge having a concave cutout portion defining a cutout region of the inner glass layer and providing an exposed area of the second surface of the outer glass layer. The antenna comprises an electrically conductive material on the second surface of the outer glass layer and has a connecting strip portion projecting onto the exposed area. A connector member has a connecting patch electrically coupled to the connecting strip portion of the antenna in the exposed area and a feed portion extending away from the peripheral edge of the outer glass layer and across and over the peripheral edge of the inner glass layer to the first surface thereof. An insulating member covers the connecting strip portion of the antenna and the connector member in the exposed area to physically separate and electrically insulate a sealing strip extending across the first surface and the cutout region of the inner glass layer adjacent the peripheral edge thereof from the antenna and connector member. Preferably, especially if the dielectric constant of the insulating member is high and the sealing strip is electrically conducting, the connecting strip portion of the antenna and the connecting patch of the connector member have at most a minimal overlap, such as no more than 200 square millimeters, with the sealing strip, for reduction of capacitive coupling therebetween.

DESCRIPTION OF A PREFERRED EMBODIMENT

Figure 1A:
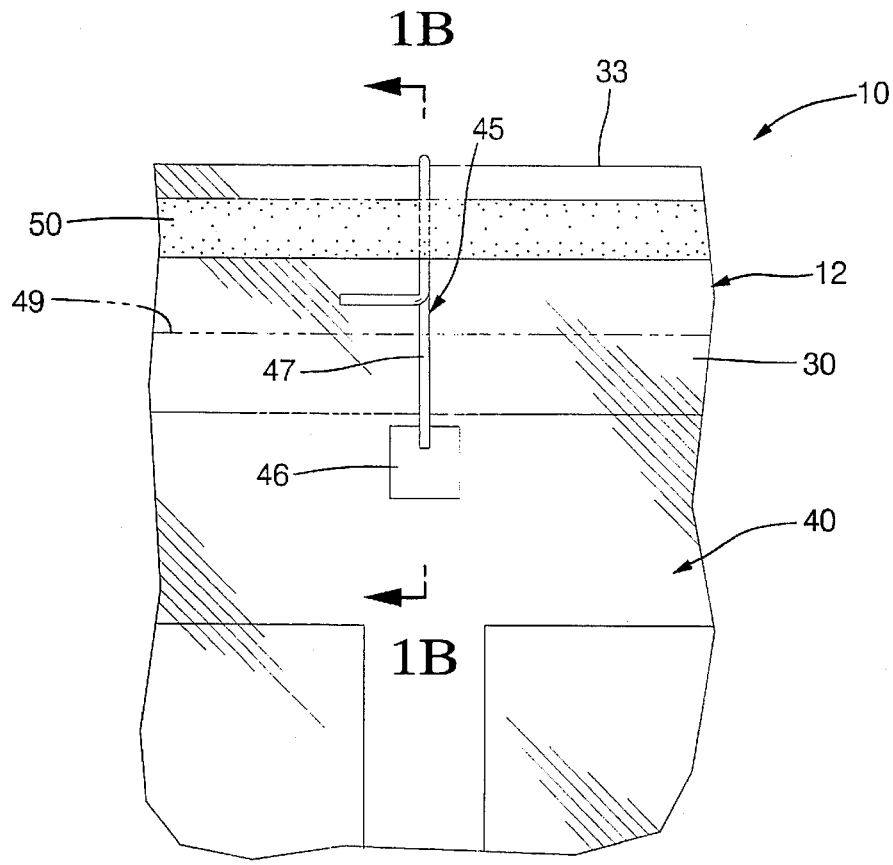
FIG. 1A shows a prior art connection apparatus for a vehicle window antenna.
Figure 1B:
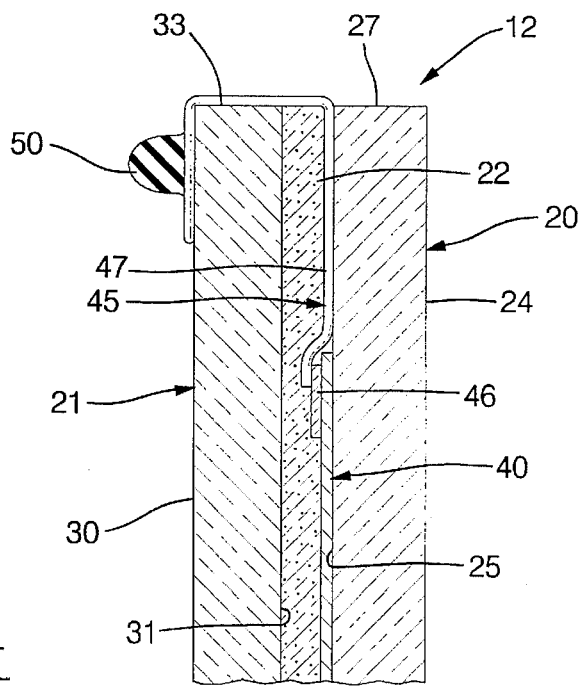
FIG. 1B shows a section view along lines 1B—1B in FIG. 1A.

A standard, prior art apparatus for connecting a window antenna to receiving apparatus is shown in FIG. 1A and 1B, in which window 12 is a standard laminated windshield retained in an window opening of a vehicle 10. Only a portion of window 12 is shown: in particular, the upper central portion. Window 12 comprises an outer glass layer 20, an inner glass layer 21 and an interposed layer 22, preferably of a standard polyvinyl butyryl or similar thermoplastic material. Outer glass layer 20 has an first surface 24 on the outside of the vehicle and an opposed second surface 25 adjacent interposed layer 22. Outer glass layer further has a peripheral edge 27, the top center portion of which may be preferably horizontal and substantially straight as shown. Inner glass layer 21 has a first surface 30 adjacent the interior of the vehicle, an opposed second surface 31 adjacent interposed layer 22 and a peripheral edge 33 aligned with peripheral edge 27 of outer glass layer 20.

Antenna 40 comprises a thin member made of an electrically conducting material and disposed between glass layers 20 and 21. Preferably, antenna 40 comprises a thin, electrically conducting film on the second surface of one of the outer and inner glass layers, shown here on the second surface 25 of outer glass layer 20. Antenna 40 may be confined to an area of window 10 out of the main line of sight for a vehicle operator or may cover a large area of window 10. In the latter case; antenna 40 is preferably made of a material transparent to visible light. A connector member 45 comprises a connecting patch 46, measuring, for example, 19 mm square, made, preferably, of a very thin, electrically conducting material such as steel or brass, and electrically coupled to antenna 40 at an upper central location. Patch 46 may be directly in contact with antenna 40, affixed to antenna 40 with an electrically conducting adhesive or affixed to antenna 40 with an insulating adhesive having dielectric qualities for capacitive coupling. Connector member 45 further comprises a feed portion comprising a wire 47 having one end attached by solder or other means to patch 46 and another end projecting out from between the peripheral edges of glass layers 20 and 21. Although not shown specifically in the figures, wire portion 47 is typically insulated except at the ends. Wire 47 is typically bent around peripheral edge 33 of inner glass layer 21 to project downward and then sideways along surface 30 of glass layer 21 in the interior of vehicle 10 and ends in a connecting plug, not shown, which is suitable for a coaxial or similar antenna cable. FIG. 1A and 1B further show a sealing strip 50 extending across surface 30 of inner glass layer 21 near an upper portion of peripheral edge 33 and over wire 47 of connector member 45. Sealing strip 50 may preferably comprise a bead of urethane; and wire 47 of connector member 45, after passing under sealing strip 50, preferably bends to the side for connection to a coaxial cable routed up one of the front pillars of the body of vehicle 10. Wire 47 of connector member 45 and the coaxial cable are tucked up under the vehicle headliner, which extends downward over the top of window 12 to the level of line 49.

A problem with the apparatus of FIG. 1A and 1B is the poor aesthetic effect of the visible portion of multi-piece connector member 45, and particularly of the wire portion 47 in the window. In addition, wire portion 47 stood out sufficiently from the glass surface that it could interrupt the smooth and even application of the urethane bead of sealing strip 50. Therefore, the connector member 45 was changed to a more aesthetic single, flat piece stamped from thin stainless steel. However, it was determined that a significant percentage of the windows having such a thin, flat connector member between the glass layers eventually developed gas bubbles around the connector member, which often did not show up until some time after their manufacture.

Figure 2A:
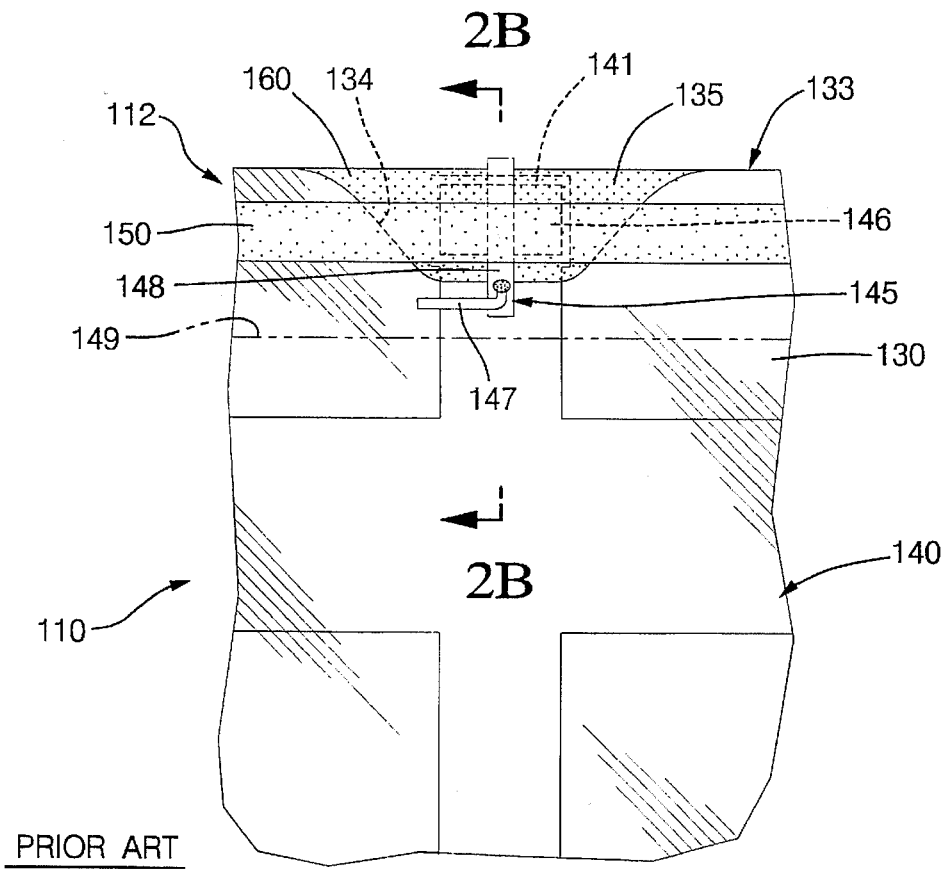
FIG. 2A shows another prior art connection apparatus for a vehicle window antenna.
Figure 2B:
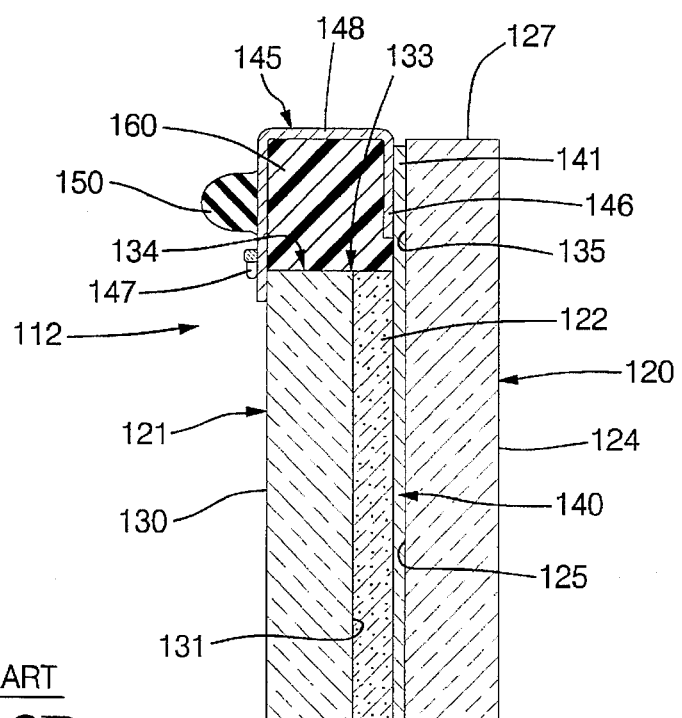
FIG. 2B shows a section view along lines 2B—2B in FIG. 2A.

Therefore, vehicle 110 was developed with a window 112, shown in FIG. 2A and 2B, which comprises outer and inner glass layers 120 and 121, an interposed layer 122 and a window antenna 140 similar to those of the apparatus of FIG. 1A and 1B with corresponding elements similarly numbered in the range 100–199.

In window 112, the peripheral edge 133 of inner glass layer 121 is indented at the upper center thereof in a notch 134 which, along with a matching indentation in interposed layer 122, defines an exposed area 135 of surface 125 of outer glass layer 120 which extends downward about 15 mm from the edge of window 112. A connecting strip portion 141 of antenna 140 projects upward past notch 134 of peripheral edge 133 onto the exposed area 135, to within a few millimeters of peripheral edge 127. Connector member 145 comprises a connecting patch 146 affixed to the connecting strip portion 141 of antenna 140 as described with respect to patch 46 and antenna 40 of FIG. 1A and 1B. An insulating member 160 comprising, for example, an epoxy material, fills the space vacated by the indentation of notch 134, the insulating member covering the exposed area 135 and patch 146 of connector member 145. Connector member 145 further comprises a feed portion, which comprises a feed strip 148 which, as best seen in FIG. 2B, projects upward from patch 146, across the top of insulating member 160 and downward adjacent insulating member 160 and surface 130 of inner glass layer 121. As with the embodiment of FIG. 1A and 1B, a sealing strip of urethane or a similar material extends across surface 130 of inner glass layer 121 near an upper portion of peripheral edge 133 and passes over insulating member 160, the surface of which is flush with surface 130 and feed strip 148 of connector member 145. The feed portion of connector member 145 further comprises a wire 147 soldered to the free end of feed strip 148 and redirected sideways for connection to a coaxial cable above the vehicle headliner as described in the previous embodiment.

In the embodiment of FIG. 2A and 2B, notch 134 allows connector member 145 to make connection with connecting strip portion 141 of antenna 140 on exposed area 135 of surface 125 of outer glass layer 120; and no part of connector member 145 is sandwiched between glass layers 120 and 121. Therefore, no gas bubbles form in window 110 as a result of the addition of connector member 145. In addition, the flatter feed portion 148 passing under sealing strip 150 is more consistent with the smooth deposit of a urethane bead. However, in this embodiment, an additional complication is introduced by the sealing strip, the urethane of which is colored black by the inclusion of carbon, since the carbon imparts a degree of electrical conductivity to the strip. If the sealing strip is in direct contact with the connector member, as it is in the embodiment described above, the antenna feed is connected through the sealing strip to ground; and antenna gain is degraded, particularly at lower radio frequencies such as the commercial AM band (0.5 to 1.5 MHz).

Figure 3A:
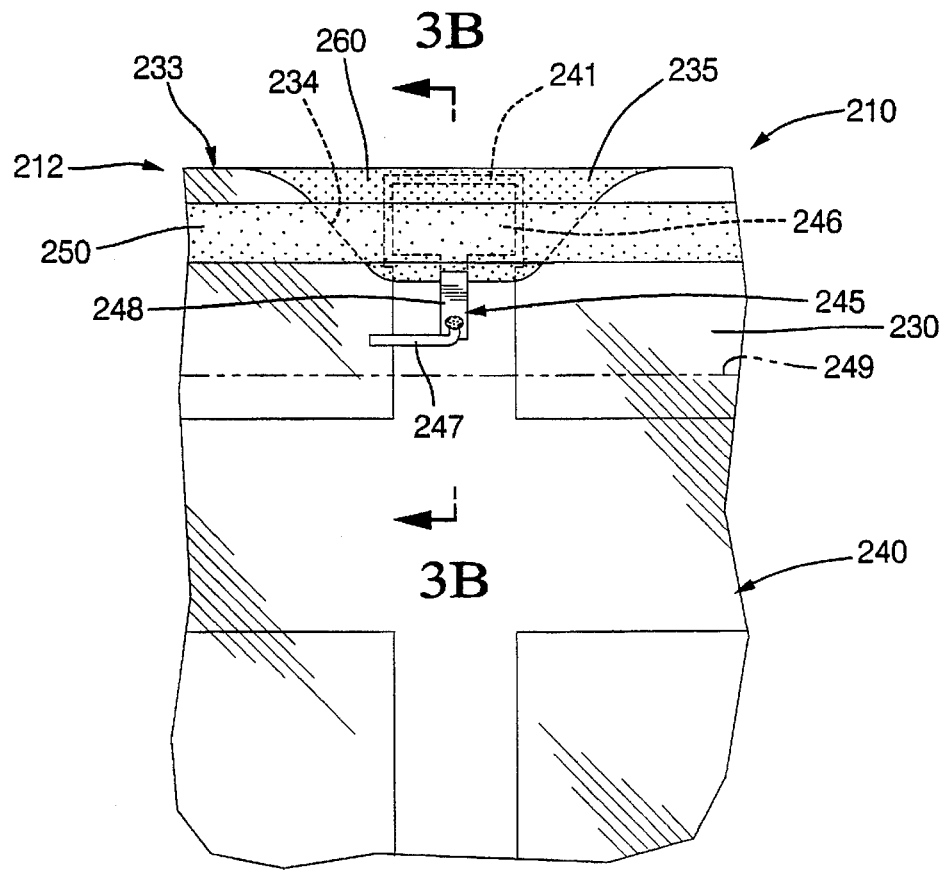
FIG. 3A shows a first embodiment of a vehicle window antenna connection apparatus.
Figure 3B:
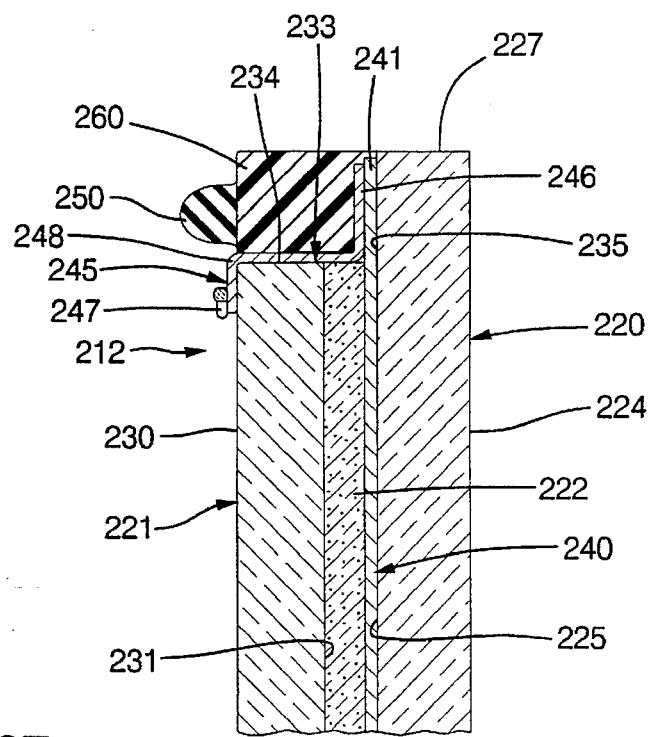
FIG. 3B shows a section view along lines 3B—3B in FIG. 3A.

Thus, vehicle 210 of FIG. 3A and 3B was developed with a window 212 having outer and inner glass layers 220 and 221, an interposed layer 222 and a window antenna 240 similar to those of window 112 of FIG. 2A and 2B and with corresponding elements similarly numbered in the range 200–299. Window 212 is similar to window 112 of FIG. 2A and 2B in every element except for some of the dimensions and the orientation and routing of the connector member 245. Notch 234 measures about 110 mm directly across the upper edge of window 212 and extends downward about 27 mm. A connecting patch 246 of connector member 245 measures about 37 mm wide and about 8 mm high and is affixed as in the previously described embodiments, about 5 mm from the upper edge of window 212, to a connecting strip portion 241 of antenna 240 on the exposed area 235 of surface 225 of outer glass layer 220, which strip portion extends to within about 2.5 mm of the upper edge of the window. However, feed strip 248 of the feed portion of connector member 245 extends from patch 246 in the opposite direction, away from peripheral edge 227 and toward peripheral edge 233 of inner glass layer 221. Feed strip 248 may be bent outward and routed across the lower end of insulating member 260, between that member peripheral edge 233, to surface 230, whereupon it is once again bent downward and routed down surface 230. Thus, it avoids physical and electrical contact with sealing strip 250, which is separated from it by insulating member 260. The feed portion of connector member 245 further comprises a wire 247 attached to the free end of feed portion 248, such as by solder, and redirected to the side for connection to a coaxial cable above the headliner as described in the previous embodiments. Alternatively, the feed portion of connector member 245 may comprise a feed strip 248 projecting downward from patch 246 only far enough for the attachment of wire 247, with wire 247 following the rest of the path described in the previous sentences.

Figure 4A:
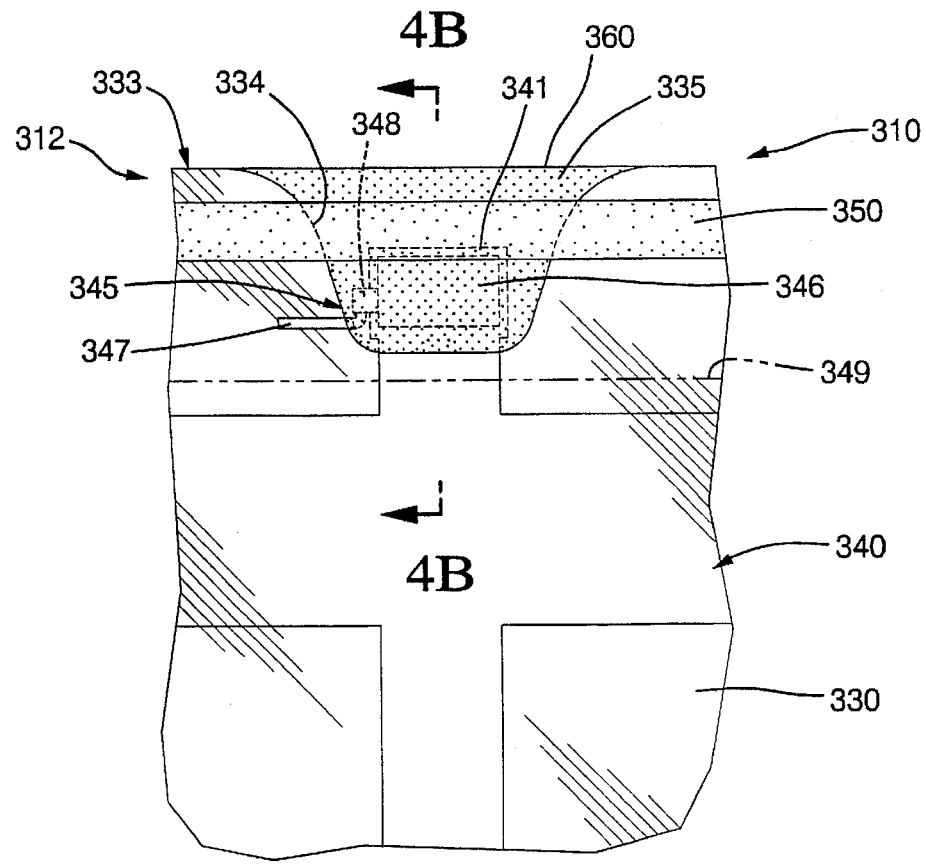
FIG. 4A shows a second embodiment of a vehicle window antenna connection apparatus.
Figure 4B:
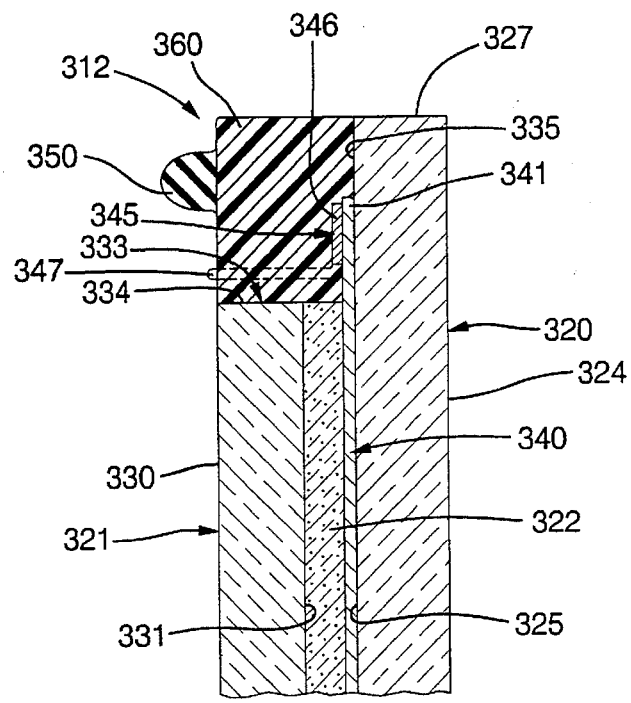
FIG. 4B shows a section view along lines 4B—4B in FIG. 4A.

In many cases, the arrangement of FIG. 3A and 3B will be sufficient for reception of RF signals by antenna 240; but there is one more possible complicating factor. It has been discovered that some epoxy substances such as might be used in the formation of insulating member 260 have high dielectric constants. Thus, insulating member 260 of window 212, although preventing direct electrical contact between contact member 245 and sealing strip 250, may provide a capacitive coupling therebetween. Therefore, the window antenna connection arrangement should be designed with care to minimize this capacitive coupling, which can degrade antenna performance in the higher radio frequency bands such as the commercial FM broadcast band (87 to 107 MHz). Vehicle 310 of FIG. 4A and 4B has a window 312 which is so designed.

Window 312 of vehicle 310 comprises outer and inner glass layers 320 and 321, an interposed layer 322, a window antenna 340, a connector member 345, an insulating member 360 and a sealing strip 350 similar to those of window 212 of FIG. 3A and 3B and with corresponding elements similarly numbered in the range 300–399. The difference between the embodiments is that the connecting strip portion 341 of antenna 340 is shortened to decrease the overlap of antenna 340 (and therefore also connector member 345) with sealing strip 350. Ideally, there is no overlap at all; but there is a limit to the allowable depth of notch 334 and a significant tolerance variation in the location and width of sealing strip 350. The embodiment shown uses a notch with the same dimensions as that of the previous embodiment, but connecting strip portion 341 of antenna 340 ends about 14 mm from the upper edge of the window. Patch 346 measures about 8 mm high; and its width is reduced to about 20 mm to allow a similar reduction in the width of connecting strip portion 341, relative to connecting strip portion 241 of the previous embodiment, so as to further reduce capacitive coupling. Since patch 346 is as far down as it can be within notch 334, feed portion 348 is moved to the side of patch 346; and wire 347 has one end attached thereto and is routed to the side, up peripheral edge 333 on the side of notch 334 and across surface 330 for connection to the coaxial cable above the vehicle headliner as in previously described embodiments. The overlap of sealing strip 350 and connecting strip portion 341 of antenna 340 will vary with the placement and width of the urethane bead which comprises sealing strip 350; and the capacitive coupling will further vary directly with the dielectric constant and inversely with the thickness of insulating member 360.

We claim:

1. A vehicle having a window opening with a window therein, the window comprising, in combination:

an outer glass layer having a first surface on the outside of the vehicle, a second surface, and peripheral edge;

an inner glass layer having a first surface adjacent the interior of the vehicle, a second surface, and peripheral edge having a notch portion defining an exposed area of the second surface of the outer glass layer;

an antenna comprising an electrically conductive material on the second surface of the outer glass layer, the antenna having a connecting strip portion projecting onto the exposed area;

a connector member having a connecting patch electrically coupled to the connecting strip portion of the antenna in the exposed area and a feed portion extending away from the peripheral edge of the outer glass layer and across and over the peripheral edge of the inner glass layer to the first surface thereof;

an insulating member covering the connecting strip portion of the antenna and the connector member in the exposed area and having a surface essentially flush with the first surface of the inner glass layer; and a sealing strip extending across the first surface of the inner glass layer and the insulating member, the sealing strip being physically separated and electrically insulated from the antenna and connector member by the insulating member.

2. The vehicle of claim 1 in which the sealing strip is electrically conducting.

3. The vehicle of claim 2 in which the insulating member comprises a dielectric material providing capacitive coupling between the connecting strip portion of the antenna and the sealing strip and the connecting strip portion of the antenna is spaced sufficiently far from the peripheral edge of the window that at least a portion of the sealing strip does not overlap the connecting strip portion of the antenna or the connecting patch of the connector member.

4. The vehicle of claim 3 in which the sealing strip does not overlap the connecting strip portion of the antenna or the connecting patch of the connector member by more than 200 square millimeters.

5. The vehicle of claim 3 in which the sealing strip does not overlap the connecting strip portion of the antenna or the connecting patch of the connector member.

* * * * *